(12) United States Patent
Cioceanu et al.

(10) Patent No.: US 6,416,225 B1
(45) Date of Patent: Jul. 9, 2002

(54) BEARING ASSEMBLY FOR WELLBORE DRILLING

(75) Inventors: Nicu Valentin Cioceanu; Troy Douglas Lorenson; George Murry Ward, all of Edmonton (CA)

(73) Assignee: CN & LT Consulting Ltd., Edmonton (CA)

(*) Notice: Subject to any disclaimer, the term of this patent is extended or adjusted under 35 U.S.C. 154(b) by 0 days.

(21) Appl. No.: 09/696,679

(22) Filed: Oct. 26, 2000

(30) Foreign Application Priority Data

Feb. 25, 2000 (CA) .............................................. 2,299606

(51) Int. Cl.⁷ ................................................ E21B 4/02
(52) U.S. Cl. .......................................... 384/97; 175/107
(58) Field of Search ............................... 384/92, 93, 94, 384/97, 98, 613; 175/107

(56) References Cited

U.S. PATENT DOCUMENTS

| | | | |
|---|---|---|---|
| 4,098,561 A | * 7/1978 | Tschirky et al. | ............ 277/504 |
| 4,220,380 A | * 9/1980 | Crase et al. | ................. 384/606 |
| 4,295,535 A | * 10/1981 | Crase et al. | ................. 175/101 |
| 4,546,836 A | 10/1985 | Dennis et al. | |
| 4,577,704 A | 3/1986 | Aumann | |
| 4,683,964 A | * 8/1987 | Wenzel | ........................ 175/107 |
| 5,048,981 A | 9/1991 | Ide | |
| 5,096,004 A | * 3/1992 | Ide | .............................. 175/107 |
| 5,195,754 A | 3/1993 | Dietle | |
| 5,217,080 A | 6/1993 | Wenzel et al. | |
| 5,248,204 A | * 9/1993 | Livingston et al. | ............ 384/97 |
| 5,350,242 A | 9/1994 | Wenzel | |
| 5,377,771 A | 1/1995 | Wenzel | |
| 5,385,407 A | 1/1995 | De Lucia | |

* cited by examiner

*Primary Examiner*—Thomas R. Hannon
(74) *Attorney, Agent, or Firm*—Bennett Jones LLP

(57) ABSTRACT

A bearing assembly is disclosed for use with a mud motor. The bearing assembly includes at least three radial bearings to protect the flow restrictor of the bearing assembly against harmful sideways and lateral loading. The bearing assembly also includes a compression nut to eliminate cracks on the mandrel at the split ring.

2 Claims, 6 Drawing Sheets

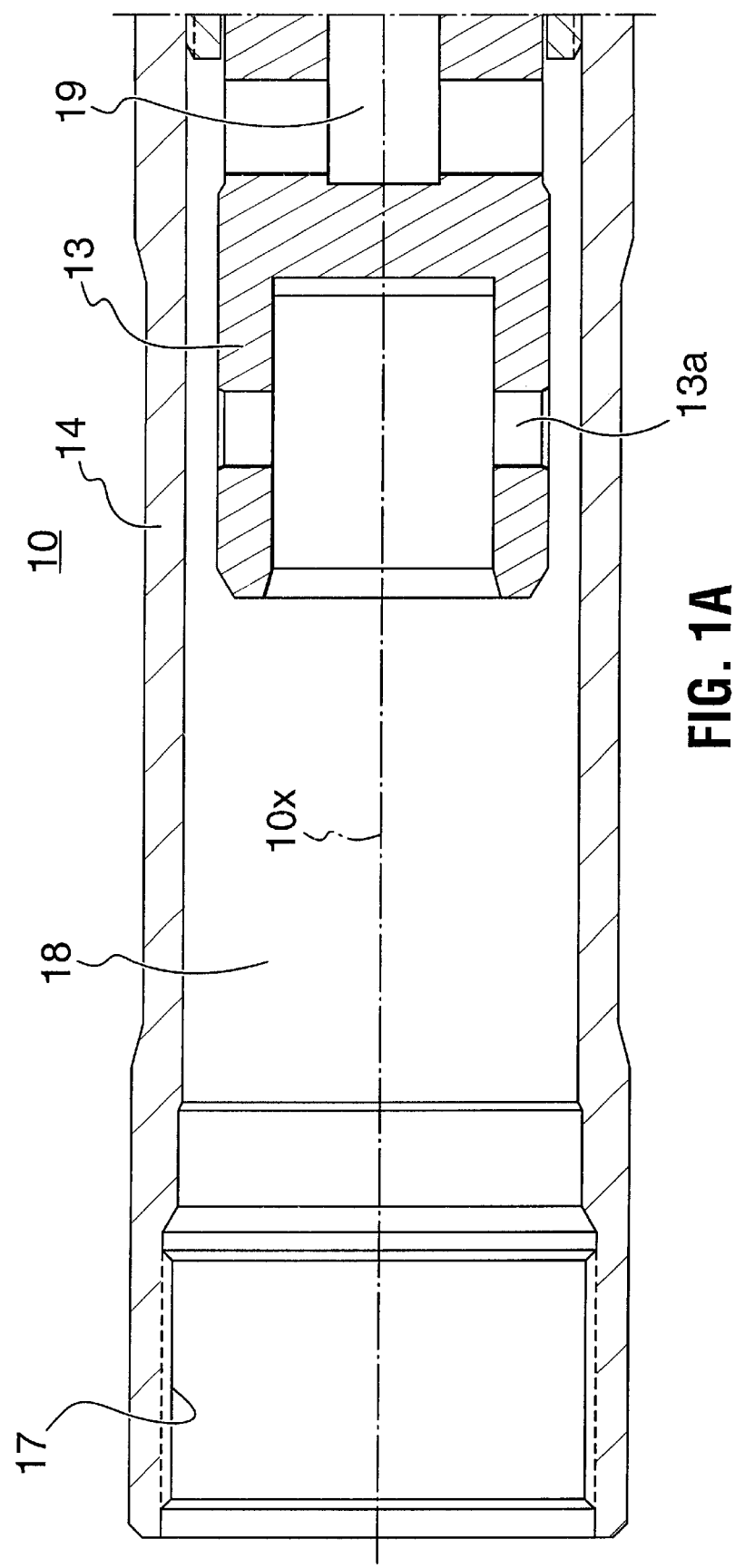

BEARING ASSEMBLY FOR WELLBORE DRILLING

FIELD OF THE INVENTION

The present invention relates to a bearing assembly for wellbore drilling and, in particular, an oil-sealed bearing assembly for use in a wellbore drilling operation.

BACKGROUND OF THE INVENTION

In the drilling of bore holes into the earth, as in the case of drilling oil and/or gas wells, it is common to drive the drill bit by a downhole mud motor located at the end of a drill string. In particular, drilling fluid, generally referred to as drill mud, is circulated to drive the motor by positive hydraulic displacement or turbine action. The mud then passes through the ports in the drill bit and carries material loosed by the drill bit back to the surface through the annular space between the drill pipe and the resulting bore hole.

Bearing assemblies for wellbore drilling are mounted between the drill bit and the drill string to permit rotation of the drill bit. The drill bit is attached to a hollow drive shaft, also known as a mandrel that is located within a bearing housing. The mandrel is rotatably driven by the mud motor while the bearing housing is fixed to the drill string and remains relatively stationary. In its position behind the drill bit, the bearing assembly is subject to significant radial and axial loading. Radial and thrust bearings are thus located along the bearing assembly to react (absorb) radial and axial loads.

Lubrication between the rotator mandrel and stator housing may be achieved by oil or mud located in the annular space between those components. In the case of oil lubrication, an oil-sealed bearing chamber is formed by seals such as PolyPak® or KALSI SEAL®. The seals are acted upon by downhole drilling fluid pressures, including pump pressures and hydrostatic pressures, resulting in higher pressures above the sealed bearing chamber as compared to below the sealed bearing chamber. Such pressure differential results in damage to the seals, leading ultimately to seal failure. To reduce the pressure differential, a flow restrictor located above the sealed chamber is used to reduce the fluid flow in the annular passageway between the mandrel and housing.

In mud lubricated bearing assemblies, it is desirable to reduce the fluid flow through he bearings to prevent premature wear due to the effects of high drilling fluid pressures, as well as the abrasive actions of the mud itself. In this case, radial bearings serve as flow restrictors.

Despite the use of flow restrictors/radial bearings to increase the durability of the bearing assembly, the flow restrictors/radial bearings are themselves limited by their ability to withstand damage resulting from lateral and radial loads incurred during drilling. Carbide-containing flow restrictors are very expensive and damage thereto is of great concern.

The mandrel component of the bearing assembly is also susceptible to damage by drilling loads, as well as by the severe shock and vibration incurred during drilling applications. In particular, the mandrel is engaged to the housing by a split ring, also called a saver ring. The split ring includes two semi-cylindrical halves having annular grooves in their inner surfaces. The machined grooves engage into annular recesses formed on the surface of the mandrel. During assembly, the halves of the split ring are fit over the mandrel. This form of assembly requires that the fit between the mandrel and the split ring to be somewhat loose. This loose fit permits some vibration between the mandrel and the split ring, thereby causing mandrel failure by cracking.

There is a need, therefore, for improved construction of bearing assemblies which provides for a longer operational life of the assembly over current constructions.

SUMMARY OF THE INVENTION

A bearing assembly for wellbore drilling has been invented. In one embodiment, the bearing assembly has an extended life without repair by providing support for the flow restrictor/radial bearing (which will be termed herein, the flow restrictor). In another embodiment, a compression nut is threadedly engaged onto the mandrel to replace the split ring.

In accordance with a broad aspect of the present invention there is a bearing assembly comprising: a first elongate member adapted for connection to a drill bit assembly; a second elongate member adapted for connection to a drill string, the first elongate member and the second elongate member being telescopically disposed and being rotatable about a long axis of the bearing assembly one relative to the other; a first bearing disposed between the first elongate member and the second elongate member; a flow restrictor positioned between the first elongate member and the second elongate member to restrict flow between the members; and a second bearing adjacent the flow restrictor and on a side of the flow restrictor opposite the first bearing.

In accordance with another broad aspect of the present invention there is a bearing assembly for use in a drill string to accommodate rotation of the drill bit comprising a first elongate member and a second elongate member, the second elongate member, being telescopically disposed over the first elongate member and the first elongate member being rotatable within the second member and about the long axis of the tool; a flow restrictor disposed between the first elongate member and the second elongate member to restrict fluid flow therebetween; a bearing on each side of the flow restrictor, the bearing assemblies being disposed to act between the first elongate member and the second elongate member.

The first elongate member and the second elongate member can be the mandrel and outer housing of the bearing assembly, respectively.

The bearings are preferably oil-lubricated requiring sealed oil chambers. A sealed, lubricated bearing offers an extended useful life over a mud-lubricated bearing. In a bearing assembly having lubricant-containing sealed bearings, preferably means are provided to balance the seals of the chamber. In one embodiment, at least one fluid flow channel is provided past the upper bearing assembly to provide for balancing the pressures at the seals of the lubricant-filled chamber. In another embodiment, openings are provided through the housing such that fluids at external pressure are in contact with chamber seals.

Preferably, the bearing assembly includes radial and thrust bearings. In one preferred embodiment the thrust bearings include on-bottom bearings for accommodating load in one direction and off-bottom bearings for accommodating load in an opposite direction to the on-bottom bearings. These thrust bearings are positioned on the bearing assembly to be adjusted simultaneously. Preferably, these thrust bearings are contained within the same lubricant-filled chamber.

In a preferred bearing assembly, there are at least three radial bearings spaced along the bearing assembly with, for example, two on one side of the flow restrictor and one on the other side. Preferably, greater radial support is provided between the flow restrictor and the bit end of the bearing assembly where greater lateral and sideways bending loads are experienced. Preferably radial bearings are positioned on either side of the flow restrictor and on either side of the thrust bearings. All radial bearings are preferably selected to maintain the mandrel concentric within the bore of the housing.

In accordance with another aspect of the present invention, there is provided a bearing assembly for use in a drill string to accommodate rotation of the drill bit comprising a first elongate member and a second elongate member, the second elongate member being telescopically disposed over and rotatable about the first elongate member; a flow restrictor disposed between the first elongate member and the second elongate member to restrict fluid flow therebetween; at least one bearing disposed to act between the first elongate member and the second elongate member and a compression nut threadably engaged to the first elongate member and disposed between the first elongate member and the second elongate member, the compression nut abutting against a shoulder on the inner diameter of the second elongate member and supporting the at least one bearing.

Preferably, the bearing is a thrust bearing. In one embodiment, the compression nut is positioned to maintain the second elongate member in telescopic arrangement over the first elongate member.

BRIEF DESCRIPTION OF THE DRAWINGS

FIG. 1 shows the orientation of FIGS. 1A to 1D.

FIGS. 1A to 1D are together a sectional view along the axis of a bearing assembly according to the present invention.

DETAILED DESCRIPTION OF THE INVENTION

Figure 1B:
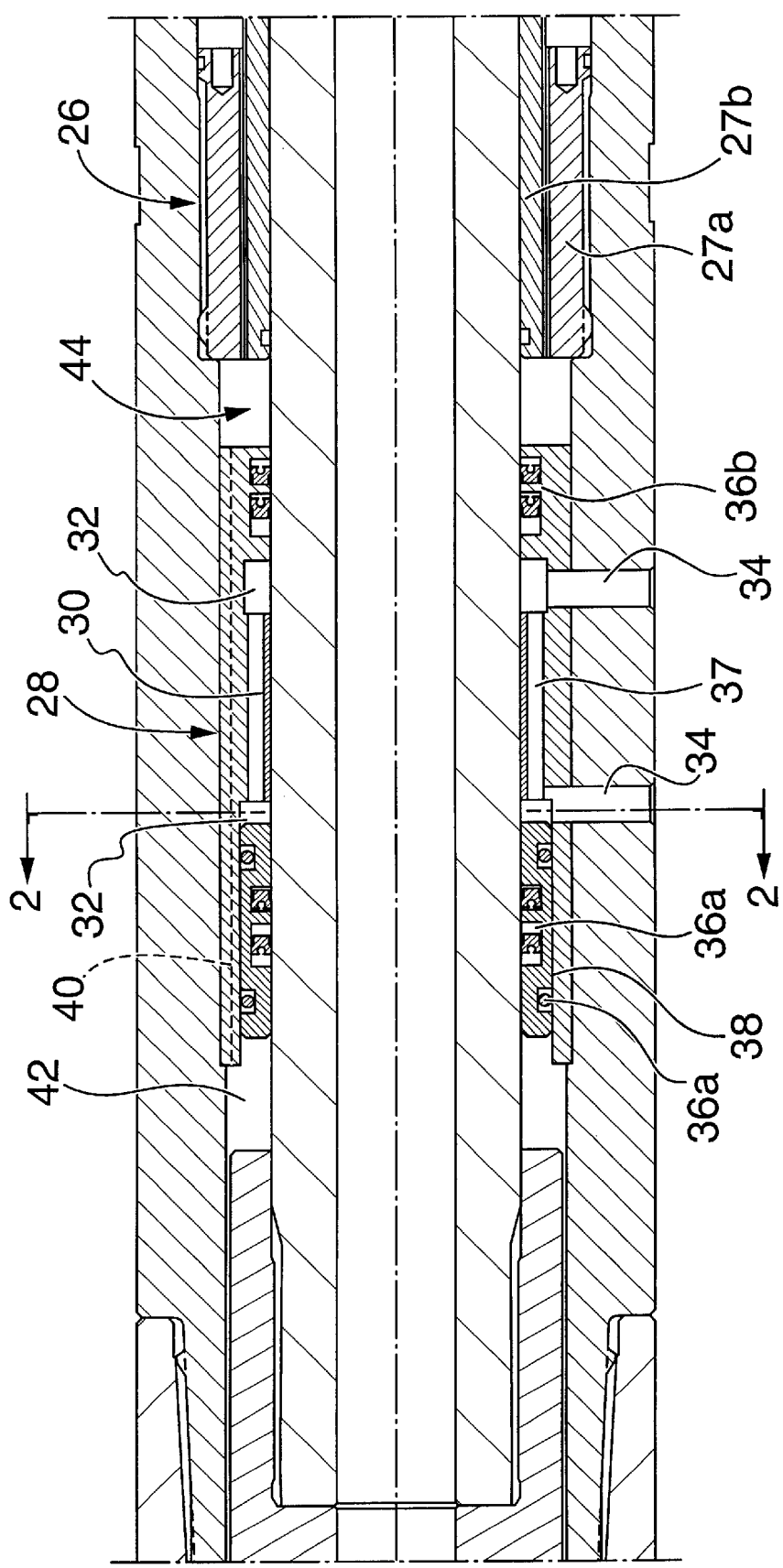

Referring to the figures, a bearing assembly 10 is shown. Bearing assembly 10 includes a mandrel 12, a mandrel adapter 13 secured by a threaded connection to the mandrel and a housing 14. Housing 14 is telescopically disposed and rotatable about mandrel 12. Box end 16 of mandrel 12 is adapted for connection directly or indirectly to a drill bit (not shown). Mandrel adapter 13 is adapted for connection to the power section of the mud motor. Holes 13a engage the motor drive shaft (not shown). Open end 17 of housing 14 is adapted for connection into a drillstring of tubulars (not shown).

In operation, bearing assembly 10 is connected between a drill bit and a drill string of tubulars. Generally, drilling fluid is pumped through the drill string into bore 18 of the housing. Thereafter, the fluid passes into the inner bore 19 of mandrel adapter and then into the inner bore 19a of the mandrel. This fluid then passes out through the ports in the drill bit and back up the outside of the housing on its way back to surface. Some of the fluid also passes through the annular space 42 between the mandrel and the housing.

The drilling fluid is under pressure as it passes through this route. In particular, in the bores of the housing and the mandrel, fluid is pressurized by hydrostatic pressure as well as pump pressure. Once the fluid passes through the drill bit ports, any pump pressure is dissipated leaving only hydrostatic pressure acting on the drilling fluid. Thus, generally, the fluid inside the bearing assembly is at a greater pressure than the fluid outside the bearing assembly.

A lubricant-filled bearing chamber 20 is disposed between mandrel 12 and housing 14 to support rotation of the mandrel relative to the housing. The lubricant is preferably oil but can be other substitutes such as silicone, grease, etc. Bearing chamber 20 is filled with oil through fill ports 21 that are sealed off before use by metal threaded plugs or welded caps. Bearing chamber 20 is sealed by upper sealing elements 22a, 22a' on a floating piston 23 and a lower sealing element 22b. These seals maintain the oil within the chamber about the bearing members contained therein. The sealing elements are for example O-rings or pressure deformable seals such as PolyPac or Kalsi seals. Sealing element 22a seals between piston 23 and mandrel 12. Sealing elements 22a' seal between piston 23 and housing 14. Piston 23 is movable axially through the annular space between the housing and the mandrel to permit expansion and contraction in the chamber volume, as caused by change in external pressure and temperature. A plated surface or a piston housing sleeve 24, for example formed of chromium iron, is secured to the surface of the housing adjacent piston 23 to provide a smooth durable surface over which the piston can move.

The seals 22a, 22a' and 22b at either end of bearing chamber 20 are pressure balanced to improve bearing operation and useful life. In particular, sealing element 22b is exposed to external pressure and openings 25 are formed through housing 14 to permit communication of fluids at external pressure to sealing elements 22a and 22a'. Bearing chamber 20 is positioned between a flow restrictor 26 and the box end 16 of the mandrel.

Flow restrictor 26 includes a stationary flow restrictor 27a secured within the housing and a rotatable flow restrictor 27b on the shaft. A stopper ring 29 supports and retains the rotatable flow restrictor on the shaft. A suitable flow restrictor is one adapted to lose no more than 10% pumping pressure, although other flow restrictors could be used, as desired. Flow restrictor 26 restricts fluid flow therepast in the annular space between the mandrel and the housing. This reduction in flow effectively reduces the differential pressure of the fluid that comes into contact with upper seals 22a and 22a' of bearing chamber 20. In particular, fluid jetting against floating piston 23 is substantially eliminated. Thus, flow restrictor 26 tends to substantially equalize the pressures acting against seals 22a, 22a' and seal 22b. This increases the useful life of bearing chamber 20.

Bearing chamber 20 contains two radial bearing surfaces 46, 48 and axial thrust bearings 49a, 49b. Radial bearings 46, 48 are positioned on either side of the thrust bearings to provide lateral support for them. As will be appreciated, all of these bearings need not be contained in the same oil-filled chamber.

A compression nut 50 is mounted on mandrel 12 and is positioned within bearing chamber 20. Compression nut 50 includes inner facing threads 51 for threaded engagement with a threaded portion 52 on mandrel 12. A shoulder 54 is formed on mandrel 12 against which compression nut 50 is torqued. Compression nut 50 is threaded onto mandrel with substantially zero tolerance such that once the compression nut is torqued onto the threaded portion of the mandrel and locked against shoulder 54, the threads are in tension and load is uniformly distributed along the interface of the threads. Any force applied to the compression nut is directly transmitted into the mandrel without vibration therebetween. Preferably the threaded engagement is through a left-hand thread, when viewed from the top. A left hand thread provides that during use, the rotation of the drill bit and circulation of the drilling fluid will cause the compression nut to be constantly torqued up on the mandrel.

The compression nut when torqued onto the mandrel acts as a part of the mandrel and increases the life span and axial thrust loading capacity of the mandrel. Thrust loading distribution on the bearing mandrel is reduced and the formation of cracks in the mandrel about the nut is prevented. The compression nut acts as a thrust bearing race providing a strong and stable support for dissipation of axial loads from the thrust bearings on either side of the nut including the on bottom 49*a* and off bottom 49*b* bearing stacks. As such, compression nut 50 provides true axial contact for the thrust bearings eliminating transversal movement and vibration between the nut and the bearing stacks and the mandrel. The compression nut also serves to effectively enlarge the outer diameter of the mandrel such that it is retained in the housing by abutment against shoulder 54 of housing.

On bottom bearing stack 49*a* is adjacent off bottom 49*b* stack. As such, these bearing stacks beneficially operate under similar pressure conditions. As will be appreciated, when one of these thrust bearings is under load preferably the other is totally free. This arrangement is termed endplay. Adjustment is necessary to accomplish endplay. By positioning the on bottom and off bottom thrust bearings in adjacent position, adjustment of endplay is facilitated. In particular, the width of setting shim 53 is selected and positioned between off bottom bearings 49*b* and a shoulder on housing 14 to control the space in which bearings act. Selection of shim 53 controls endplay for both thrust bearings 49*a*, 49*b* simultaneously.

According to the present invention, the bearing assembly includes a second bearing section 28 positioned between flow restrictor 26 and end 17 of housing 14. In general, bearing section 28 provides support for radial and end loading of the bearing assembly in drilling applications using drilling mud motors. Bearing 28 also protects the flow restrictors from sideways and bending loads. The components of flow restrictors are very brittle and subject to cracking and failure when subject to such forces. Bearing 28 holds concentric the flow restrictors about the mandrel thereby increasing their useful life.

Figure 1C:
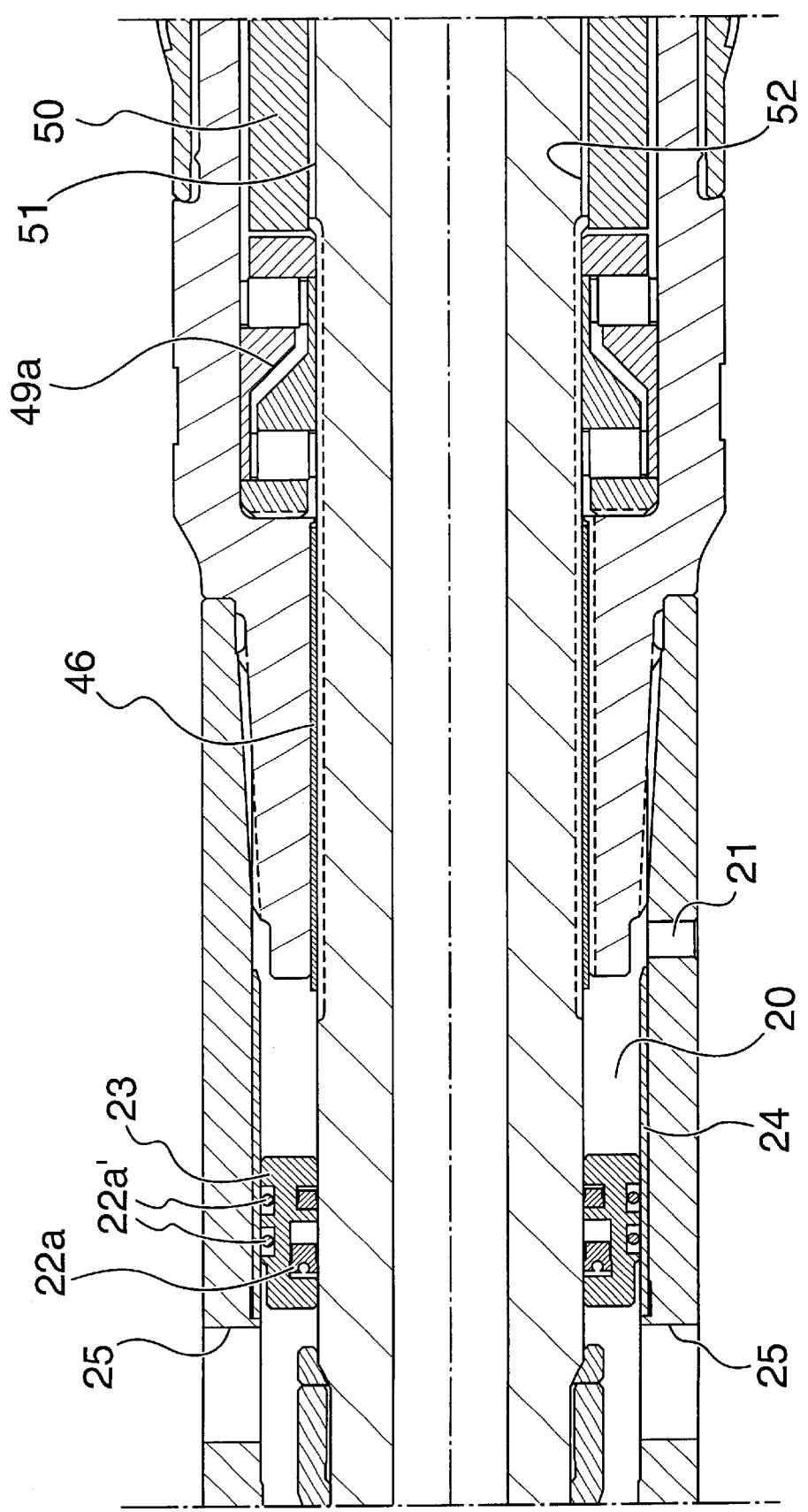
Figure 1D:
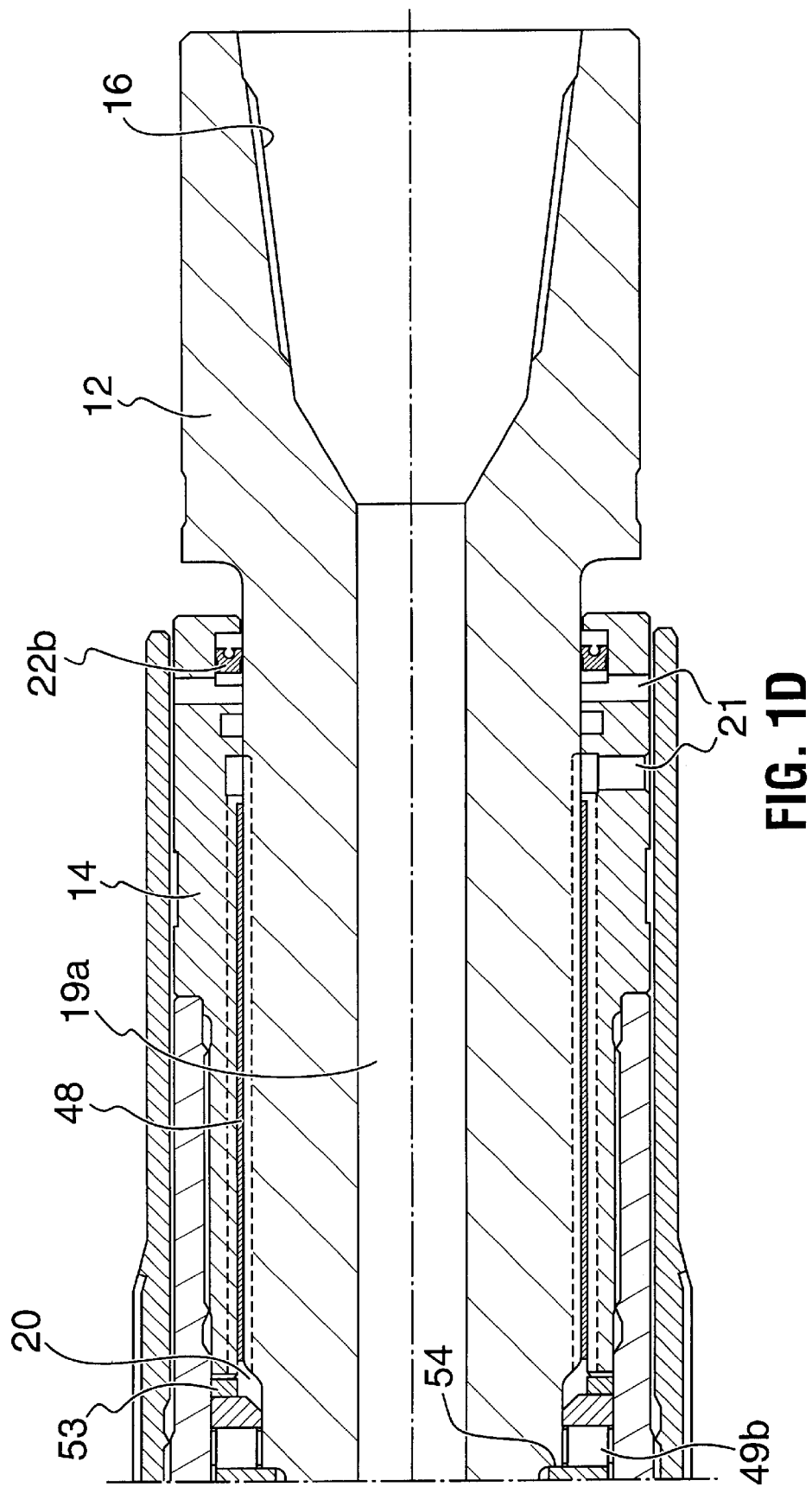
Figure 3:
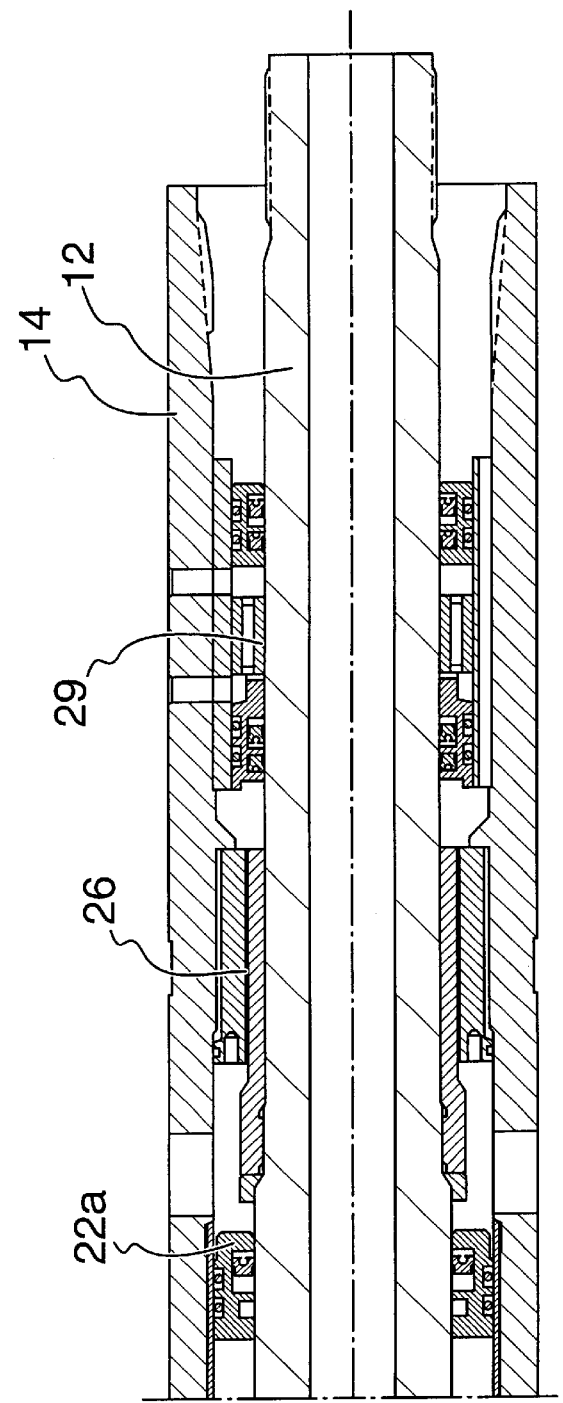
FIG. 3 is a partial sectional view of another bearing assembly according to the present invention.
Figure 4:
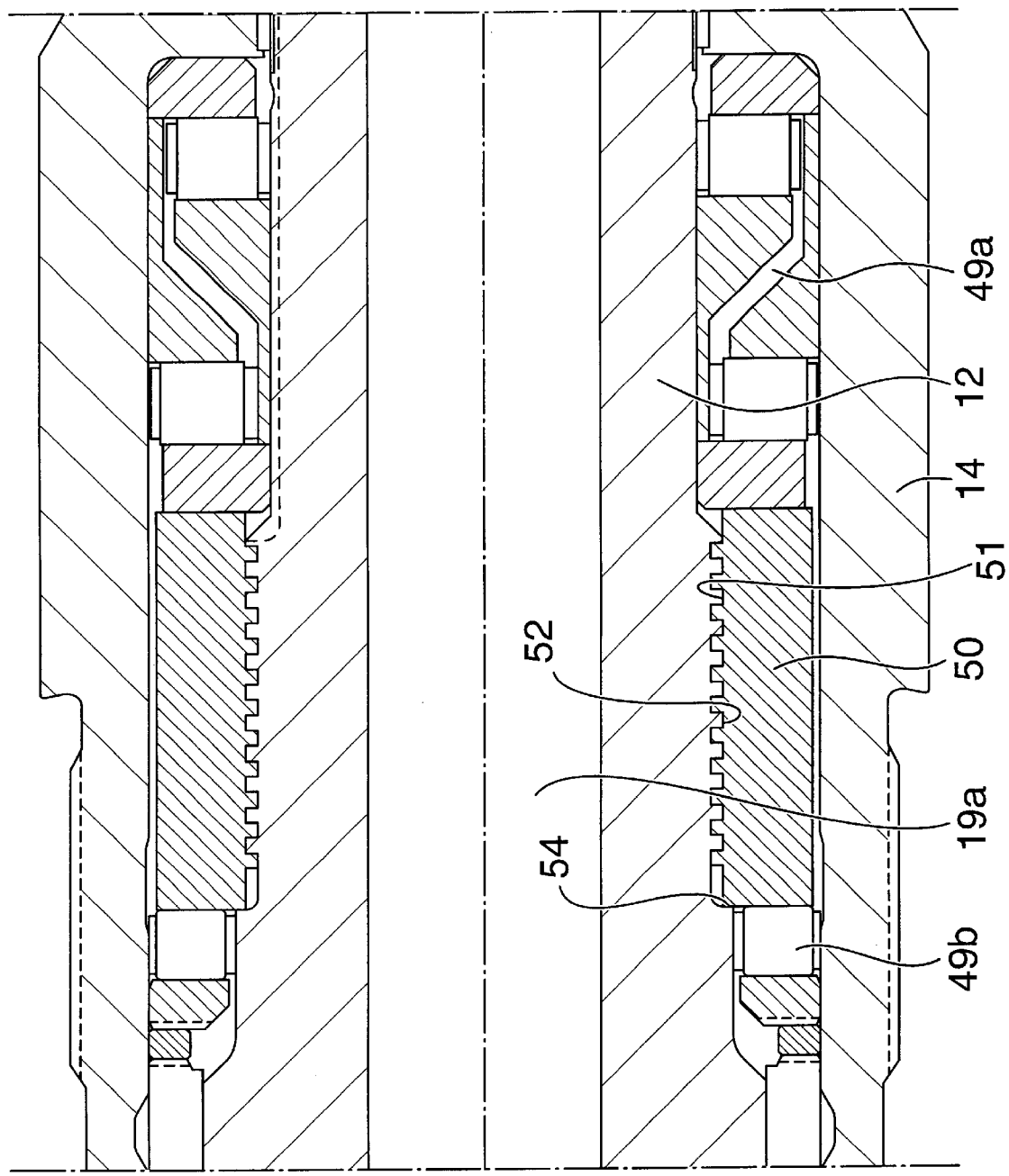
FIG. 4 is an enlarged view of a bearing having mounted thereon a compression nut.

Bearing 28 can be any radial bearing suitable for downhole use such as for example, a mud lubricated bearing or an oil lubricated bearing. Because of the longer useful life of oil-filled bearings in most downhole conditions, oil-filled bearings are preferred. In one embodiment as shown in FIG. 3, the bearing is a roller bearing 29 in an oil-filled chamber. In the embodiment illustrated in FIGS. 1, a du bearing 30 is used. Du bearing 30 is positioned in a chamber 32 filled with oil through fill ports 34. Du bearing 30 includes a housing 35 positioned in the annulus between housing 14 and mandrel 12. Housing 35 includes longitudally extending channels 37 that permit lubricant flow along the radial bearing surface. The chamber is sealed by upper seals 36*a* and lower seals 36*b*. Upper seals 36*a* are carried on a floating piston 38 that moves depending on the fluid pressures and temperatures in which the bearing assembly is operating.

Figure 2:
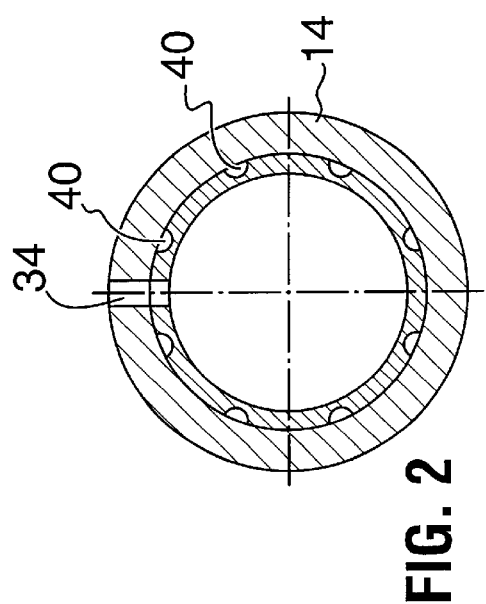
FIG. 2 is a section through an upper bearing along line 2—2 of FIG. 1B with the mandrel, Du bearing and floating piston removed.

To equalize the pressures acting on upper seals 36*a* and lower seals 36*b*, and thereby to prevent damage to the seals such as by extrusion thereof, channels 40 are provided for flow of drilling fluid past bearing section 28. Channels 40 are formed in the outer surface of housing 35 and extend along its length. Thus, chambers 42, 44, above and below, respectively, bearing 28 are maintained at substantially equal pressures. While eight channels are shown in FIG. 2, other numbers of channels can be used as desired.

Channels 40 by pass the bearing chamber but do not affect the concentricity of the mandrel within the housing inner bore. In particular, the channels are formed in a spaced apart manner on housing 35 maintaining a maximum outer diameter approximately equal to that of the inner diameter of the housing 14.

Since turbulence in the drilling fluid can damage the bearing assembly, preferably the channels are formed to minimize turbulence in the drilling fluid passing therethrough. In one embodiment, to reduce the formation of turbulence the channels are preferably oriented substantially parallel to the long axis 10*x* of the bearing assembly. By forming substantially axially oriented channels past the second bearing, axial flow of the drilling fluid is maintained. For use in shallow wells, where pressures of drilling fluid are not so great, these channels can be omitted, if desired.

To facilitate assembly the housing and mandrel can be formed in separate parts that are secured together during assembly.

Although preferred embodiments of the present invention have been described in some detail hereinabove, those skilled in the art will recognize that various substitutions and modifications may be made to the invention without departing from the scope and spirit of the appended claims.

What is claimed is:

1. A bearing assembly comprising:
    a first elongate member adapted for connection to a drill bit assembly; a second elongate member adapted for connection to a drill string, the first elongate member and the second elongate member being telescopically disposed;
    a lower bearing disposed between the first elongate member and the second elongate member adjacent the drill bit assembly, the bearing being sealed in an oil filled chamber and a seal to seal the oil within the chamber;
    a flow restrictor positioned between the first elongate member and the second elongate member to restrict flow between the members, the flow restrictor being positioned above the lower bearing between the lower bearing and the drill string; and
    an upper bearing disposed to act between the first elongate member and the second elongate member and positioned between the flow restrictor and the drill sting, and a fluid conduit provided about the upper bearing to permit fluid flow to the flow restrictor.

2. A bearing assembly for use in a drill string to accommodate rotation of the drill bit comprising:
    a first elongate member and a second elongate member, the second elongate member being telescopically disposed over and rotatable about the first elongate member; a flow restrictor disposed between the first elongate member and the second elongate member to restrict fluid flow therebetween; at least one bearing disposed to act between the first elongate member and the second elongate member and a compression nut threadably engaged to the first elongate member and disposed between the first elongate member and the second elongate member, the compression nut abutting against a shoulder on the inner diameter of the second elongate member to maintain the second elongate member in telescopic arrangement over the first elongate member.

* * * * *